US010038352B2

(12) United States Patent
Airoldi et al.

(10) Patent No.: US 10,038,352 B2
(45) Date of Patent: Jul. 31, 2018

(54) GENERATOR ARMATURE

(71) Applicant: SIEMENS AKTIENGESELLSCHAFT, München (DE)

(72) Inventors: Giovanni Airoldi, Brande (DK); Mads Peter Zippor Leth Andersen, Låsby (DK); Erik Groendahl, Them (DK); Bo Nedergaard Jacobsen, Odder (DE); Peter Hessellund Soerensen, Brædstrup (DK); Arwyn Thomas, Cheshire (GB)

(73) Assignee: SIEMENS AKTIENGESELLSCHAFT (DE)

( * ) Notice: Subject to any disclaimer, the term of this patent is extended or adjusted under 35 U.S.C. 154(b) by 448 days.

(21) Appl. No.: 14/706,192

(22) Filed: May 7, 2015

(65) Prior Publication Data
US 2015/0372566 A1    Dec. 24, 2015

(30) Foreign Application Priority Data

Jun. 18, 2014  (EP) .................................... 14172957

(51) Int. Cl.
*H02K 1/20* (2006.01)
*H02K 9/04* (2006.01)
(Continued)

(52) U.S. Cl.
CPC ................ *H02K 9/04* (2013.01); *F03D 9/25* (2016.05); *H02K 1/20* (2013.01); *H02K 7/1838* (2013.01); *Y02E 10/725* (2013.01)

(58) Field of Classification Search
CPC .. H02K 9/00; H02K 9/02; H02K 9/04; H02K 9/06; H02K 9/08; H02K 9/10; H02K 9/12;
(Continued)

(56) References Cited

U.S. PATENT DOCUMENTS 7,714,467 B2 *  5/2010  Pfannschmidt .......... H02K 9/02
                                                    310/216.001
8,258,669 B2 *  9/2012  Shikata .................. H02K 1/148
                                                    310/179
(Continued)

FOREIGN PATENT DOCUMENTS

JP        S4943705 U     4/1974
JP        S5950546 U     4/1984
(Continued)

OTHER PUBLICATIONS

Extended European search report; Application No. 14172957.4-1809; 10 pgs.
(Continued)

*Primary Examiner* — Tran Nguyen
(74) *Attorney, Agent, or Firm* — Schmeiser Olsen & Watts LLP

(57) ABSTRACT

A generator armature including a plurality of laminate sheets stacked to form an annular arrangement of armature teeth, whereby each pair of adjacent armature teeth is separated by an axial winding slot extending a direction essentially parallel to an axis of rotation of the generator; and a plurality of radial cooling channels, whereby a radial cooling channel is realized to transport a cooling medium and extends from an axial winding slot to an interior cavity of the generator, and wherein a radial cooling channel includes a series of aligned notches in the laminate sheets of a laminate stack is provided. A laminate sheet for an armature of a generator, a cooling arrangement, a generator, a wind turbine, and a method of cooling stator windings arranged on an armature of a generator is also provided.

14 Claims, 4 Drawing Sheets

(51) Int. Cl.
*F03D 9/25* (2016.01)
*H02K 7/18* (2006.01)

(58) Field of Classification Search
CPC .. H02K 9/19; H02K 1/12; H02K 1/14; H02K 1/146; H02K 1/20; H02K 1/32; H02K 3/12; H02K 3/24; H02K 3/46; H02K 3/47
See application file for complete search history.

(56) References Cited

U.S. PATENT DOCUMENTS

| | | |
|---|---|---|
| 2004/0084976 A1 | 5/2004 | Thiot |
| 2009/0058204 A1 | 3/2009 | Sirois |
| 2010/0102652 A1* | 4/2010 | Booth ................ H02K 9/08 310/54 |
| 2011/0001320 A1 | 1/2011 | Lagerweij et al. |
| 2011/0181137 A1* | 7/2011 | Kori ................ H02K 9/12 310/59 |
| 2011/0221286 A1* | 9/2011 | Uchiyama ........... H02K 1/20 310/54 |
| 2012/0119603 A1* | 5/2012 | Kowalski ........... H02K 1/32 310/58 |

FOREIGN PATENT DOCUMENTS

| | | | | |
|---|---|---|---|---|
| JP | H09285052 A | | 10/1997 | |
| JP | 2012186880 A | * | 9/2012 | ............ H02K 1/20 |
| WO | WO 2012118008 A1 | | 9/2012 | |
| WO | WO 2013170883 A1 | | 11/2013 | |

OTHER PUBLICATIONS

Chinese language Office Action dated Jun. 4, 2018 for Application No. 201510339554.9.

* cited by examiner

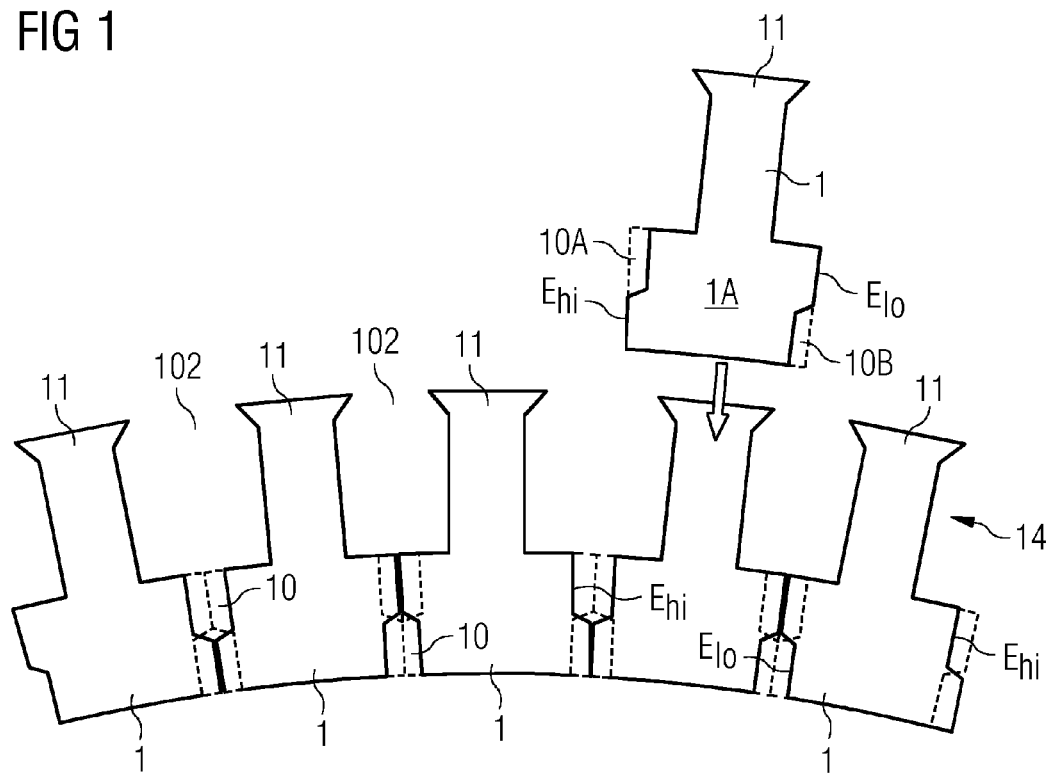

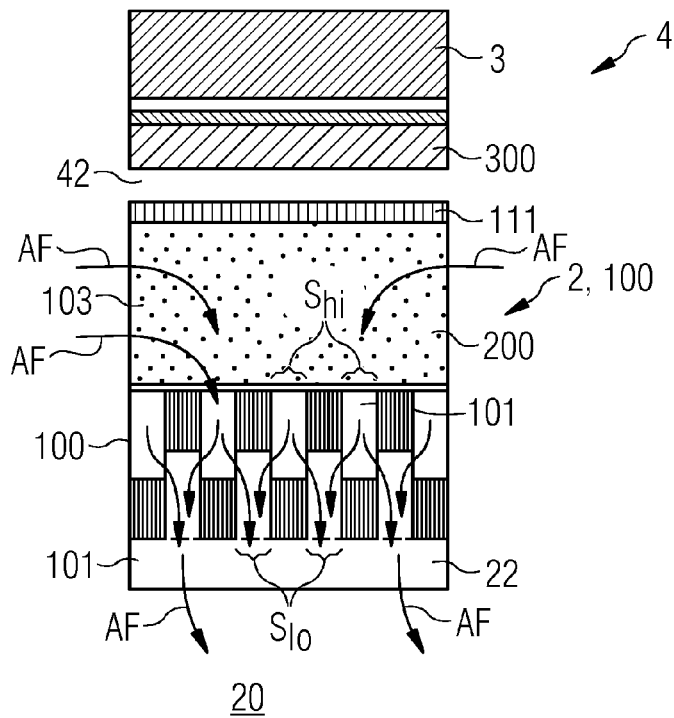
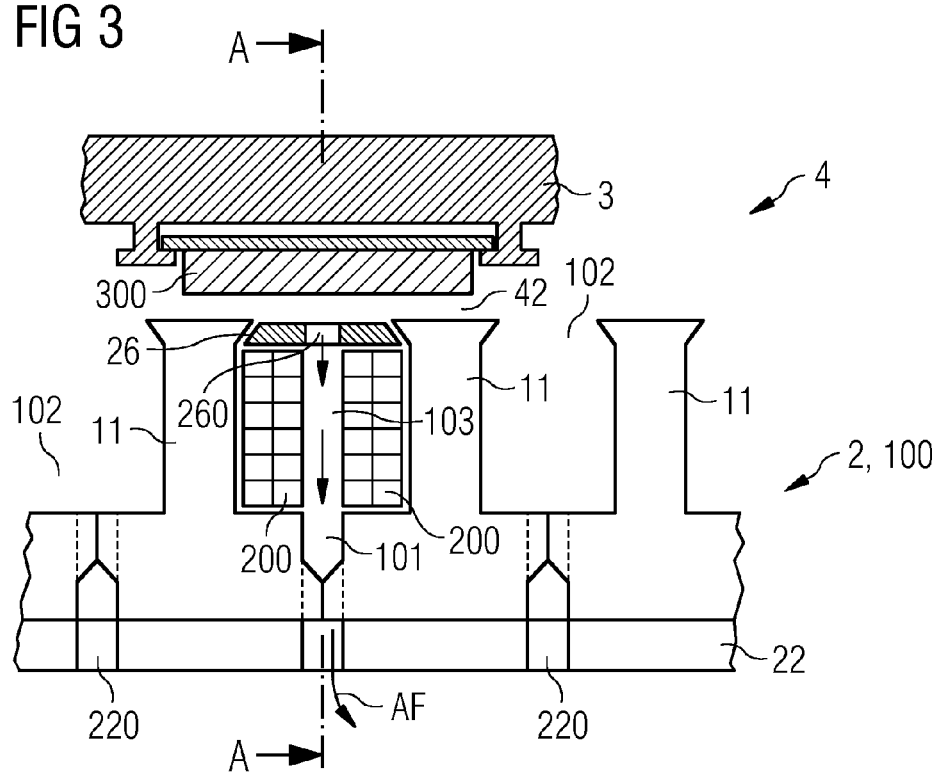

GENERATOR ARMATURE

CROSS-REFERENCE TO RELATED APPLICATIONS

This application claims priority to EP Application No. 14172957.4, having a filing date of Jun. 18, 2014, the entire contents of which are hereby incorporated by reference.

FIELD OF TECHNOLOGY

The following describes a generator armature, a laminate sheet, a cooling arrangement realized to cool stator windings of a generator, a generator, a wind turbine, and a method of cooling the stator windings of a generator.

BACKGROUND

In the known generator designs in which an inner or outer stator acts as the armature, the stator is loaded with a plurality of windings or coils, and a corresponding rotor is loaded with magnets or magnet pole pieces. The armature itself is usually made by stacking laminate sheets of a suitable material such as electrical steel or silicon steel, and arranging these about a supporting structure. A laminate sheet is pre-cut or punched in the desired shape according to the required number of stator windings and stator teeth, and, when mounted on the supporting structure, will extend radially outward. In the case of very large electric motors or generators, a laminate sheet can comprise an arc segment of the stator, with a number of armature teeth protrusions that define the winding slots. Each winding is arranged in a slot formed between adjacent stator teeth. A laminate sheet serves to fulfill various important functions such as reducing eddy currents, lowering hysteresis, and providing a path for magnetic flux. For this reason, a laminate sheet is usually realized as an uninterrupted area with a main body and a number of stator tooth protrusions. Ideally, the metal of the laminate sheet provides the magnetic flux with an uninterrupted path through the body of the laminate sheet.

During operation of a generator such as a wind turbine generator, high levels of electrical current are induced in the windings, and these become very hot as a result. A high temperature in the windings is undesirable for a number of reasons. The resistance of the windings increases at higher temperatures, with a detrimental effect on the generator's output power. Also, the heat from the generator is passed to the magnets and can have an adverse effect on their performance. Other components in the generator, such as electrical circuitry for auxiliaries, can also be affected by the high temperatures. Therefore, much effort is invested in attempting to cool the generator.

In some prior art approaches to cool the windings, a cooling fluid is brought as close as possible to the stator windings. For example, a cooling airflow can be directed into the air-gap between rotor and stator, so that some heat can be transported away by the cooling airflow. Heat dissipation elements such as cooling fins may be mounted onto an exterior surface, for example onto the outer surface of an outer rotor, in an effort to transfer heat away from the magnets that have in turn been heated by the windings across the air-gap. Other cooling techniques involve arranging a heat exchanger in an interior space of the generator in an attempt to reduce the heat in the generator. However, these approaches are all limited to some extent by the generator design, specifically by constraints that affect the stator design. For example, in most designs it is not possible to access the hot windings directly since each winding is closely packed between adjacent stator teeth. In other designs it is not possible to access the windings or the stator supporting structure for cooling purposes. Effectively, the narrow airgap and the laminate stack of the stator inhibit access to the hot windings. Therefore, the effectiveness of the known designs is limited by the inability to draw heat away from the windings as well as the supporting structure. In one approach, channels are formed to extend through the stator teeth between the generator airgap and the stator interior, and the purpose of the channels is to allow cooling air to pass through the body of the stator. However, to be effective in cooling the hot stator, a large number of such channels are required. Since the channels effectively remove metal from the body of the stator, the magnetic flux is adversely affected. Furthermore, such channels are formed in the stator teeth and are therefore not close to the stator windings, so that their effectiveness at drawing heat away from the winding is limited.

SUMMARY

An aspect relates to an improved way of removing the heat generated in the windings of a stator.

According to embodiments of the invention, the generator armature comprises a plurality of laminate sheets stacked to form an annular arrangement of armature teeth, whereby each pair of adjacent armature teeth is separated by an axial winding slot extending in a direction essentially parallel to an axis of rotation of the generator; and a plurality of radial cooling channels realized to transport a cooling medium, whereby a radial cooling channel extends from an axial winding slot to the opposite side of the armature, and wherein a radial cooling channel is formed by a series of coordinated or aligned notches in the laminate sheets of a laminate stack.

An advantage of the generator armature according to embodiments of the invention is that by providing the radial cooling channels, it is made possible—during operation of a generator using such an armature—to allow the cooling medium (e.g. a fluid such as air) to pass from an axial winding slot through a radial cooling channel and into the interior cavity of the armature, where the warmed medium can be cooled again, or expelled. Since it is the windings that are the major source of heat in a generator, the armature according to embodiments of the invention provides a convenient way of allowing the cooling medium to draw heat away from the windings, through the radial cooling channels, and out to the opposite side of the armature. In the case of a generator with outer rotor carrying the magnets, the armature will act as an inner stator, so that the cooling medium can pass through the radial cooling channels into an interior cavity of the stator. From there, it can be cooled or extracted as appropriate. The armature according to embodiments of the invention is manufactured using a known approach of stacking laminate sheets to arrive at the desired form. The concept of aligning or coordinating the notches in the laminate sheets to form radial cooling channels when the laminate sheets are stacked is a favorably straightforward way of obtaining a desired arrangement of radial cooling channels, since it does not adversely affect the functions that need to be fulfilled by the laminate sheets. For instance, it would not be possible to drill a hole through the laminate stack from a winding slot into the stator interior, since laminate material is brittle and does not withstand such mechanical stress. In the generator armature according to embodiments of the invention, the radial channels can be formed without damaging the material of the laminate sheets, and without "removing" any significant quantity of metal from the armature. Therefore, the cooling arrangement according to embodiments of the invention ensures a favorable magnetic flux in the armature, required for efficient operation of the generator, while at the same time providing a path for a cooling airflow.

According to embodiments of the invention, the cooling arrangement is realized to cool stator windings of a stator of a generator, wherein the stator comprises such an armature, and comprises a plurality of axial cooling channels, wherein an axial cooling channel extends along a gap between adjacent stator windings arranged in an axial winding slot of the armature; a plurality of radial cooling channels realized to transport a cooling medium, wherein a radial cooling channel comprises a radial cooling channel of the armature; and an airflow guiding means realized to guide a cooling airflow along the axial cooling channels and subsequently through the radial cooling channels into an interior cavity of the stator.

An advantage of the cooling arrangement according to embodiments of the invention is that heat can be drawn away from the hot windings in a significantly more effective manner. As a result, the efficiency of the generator can be improved noticeably.

According to embodiments of the invention, the laminate sheet is realized for an armature of a generator, and comprises a number of armature tooth protrusions; a portion of a notch arranged on at least one side part of the laminate sheet; and/or at least one complete notch arranged to one side of an armature tooth protrusion.

An advantage of the laminate sheet according to embodiments of the invention is that it can be cut or punched out in the usual manner, while at the same time provision is made for the realization of a number of radial cooling channels when a plurality of such laminate sheets is later assembled to construct an armature.

According to embodiments of the invention, the generator comprises an outer rotor and an inner stator, which stator comprises an armature according to embodiments of the invention arranged on an annular supporting structure, and a plurality of windings arranged pair-wise between adjacent armature teeth, and wherein the stator is realized for connection to a cooling arrangement according to embodiments of the invention.

An advantage of the generator according to embodiments of the invention is that it can operate more efficiently than a comparable generator cooled by a prior art approach. Furthermore, the generator according to embodiments of the invention can be constructed in a straightforward manner, since the radial cooling channels arise during assembly of the laminate stacking of the armature, and do not require any specific manufacturing step after assembly of the stator.

According to embodiments of the invention, the wind turbine comprises a direct-drive generator with an outer rotor realized to bear a magnet arrangement, and an inner stator realized to bear a winding arrangement, which stator comprises an armature according to embodiments of the invention, and a cooling arrangement according to embodiments of the invention for cooling the windings of the stator.

An advantage of the wind turbine according to embodiments of the invention is that its power output can be increased, since the generator can operate more efficiently than one that is cooled by a prior art approach. The very effective cooling allows the generator to be operated for longer periods of time at a high power output.

According to embodiments of the invention, the method of cooling the stator windings of a generator comprises the steps of providing an armature according to embodiments of the invention; providing a plurality of axial cooling channels, wherein an axial cooling channel extends along a gap between adjacent stator windings arranged in an axial winding slot of the armature; guiding a cooling medium along the plurality of axial cooling channels and subsequently through the radial cooling channels of the armature into an interior cavity of the stator.

An advantage of the method according to embodiments of the invention is that a cooling medium can be very easily brought to the hottest part of the generator, i.e. to the windings, so that heat can be quickly and efficiently transported away from the windings. The efficient cooling prevents the magnets from becoming too hot, so that the efficiency of the generator can be significantly improved.

In the following, without restricting embodiments of the invention in any way, it may be assumed that the stator has a front end, usually referred to as the drive end, since the generator is connected at that end to the rotor hub which acts to turn the rotor. It may also be assumed that the rear end of the stator is the non-drive end, which usually faces into the nacelle or canopy of the wind turbine.

Any suitable cooling medium can be used to draw heat away from the windings. For example, a system of narrow tubes could transport a cooling fluid in the axial cooling channels between windings and though the radial cooling channels. However such a realization may be relatively complex to achieve. Preferably, air is used as the cooling medium. In the following therefore, but without restricting embodiments of the invention in any way, it may be assumed that the cooling medium is air that can freely pass along the axial and radial cooling channels.

As described above, the armature is made by stacking laminate layers so that the assembled stack is annular and comprises a certain number of stator teeth, separated by winding slots. A typical laminate layer may have a thickness of 0.5 mm. Therefore, an armature with a depth of 1.0 m would require a laminate stack that is 2000 layers deep. It may also be assumed in the following that an overall annular laminate layer comprises a plurality of laminate sheet sections. In other words, an annular laminate layer (covering 360°) can comprise n laminate sheet sections, where each laminate sheet covers an arc comprising 360/n degrees. An exemplary armature of 1.0 m depth for carrying 108 winding pairs can be constructed using laminate sheets, each of which is shaped to include three stator teeth. Therefore, each laminate sheet will cover 10° of a full circle, and 36 laminate sheets are required to make up a full circle. The entire armature will therefore require 72,000 laminate sheets with a thickness of 0.5 mm.

The width of a radial cooling channel is given essentially by the width of a notch, as measured along a virtual line extending between adjacent stator teeth. The length of a radial cooling channel, as measured along a virtual line extending between the drive end and non-drive end of the stator, can be chosen on the basis of the number of radial cooling channels along a winding slot between drive end and non-drive end, and the quantity of air that should be drawn through the radial cooling channels. Since a radial cooling channel arises from the alignment of notches formed in adjacent laminate sheets, the cross-sectional area of a radial cooling channel will be essentially rectangular. The length of the radial cooling channel may be governed by the thickness of the laminate sheets. Preferably, the width and length of a radial cooling channel is in the region of 2.0 mm-6.0 mm, and can be formed by stacking an appropriate number of laminate sheets as described above. For example, eight laminate sheets with a thickness of 0.5 mm as described above, for an armature according to embodiments of the invention, would result in a radial cooling channel with a length of about 4.0 mm when stacked. For a notch width of 5.0 mm, corresponding to the radial cooling channel width, the cross-sectional area of the radial cooling channel is then about 20.0 mm².

As already explained, a continuous path should be provided for magnetic flux in order to achieve a satisfactory performance of the generator. Therefore, in a particularly preferred embodiment of the invention, a radial cooling channel comprises at least a first series of aligned notches and a second series of aligned notches, wherein the second notch series is radially offset from the first notch series. For example, the first series of aligned notches can be formed in a first partial stack of laminate sheets, so that a first notch commences at the base of an axial winding slot at an "outer" edge of a laminate sheet and extends essentially half-way into the main body of that laminate sheet. Similarly, the second series of aligned notches can be formed in a second partial stack of laminate sheets (for arranging next to the first partial stack), so that a second notch commences at the "inner" edge of a laminate sheet and extends essentially half-way into the main body of that laminate sheet (here, the terms "inner" and "outer" are used in the context of an inner stator, so that the "inner" edge is closest to the stator interior). In this way, when first partial stacks of laminate sheets are arranged alternatingly with second partial stacks, an arrangement of radial cooling channels is achieved. The path of a radial cooling channel from the winding slot to the armature interior will therefore exhibit a "step" as the inwardly directed first notches meet the outwardly directed second notches. This will become clear in the explanation of the drawings.

As already indicated, a laminate sheet can include any number of armature tooth protrusions. Preferably, therefore, if a laminate sheet comprises a plurality of armature tooth protrusions, it also comprises alternating first and second notches so that a first inwardly directed notch is formed between one pair of armature tooth protrusions, and a second outwardly directed notch is formed between the next adjacent pair of armature tooth protrusions.

The cost of manufacturing the armature according to embodiments of the invention is preferably kept favorably low. This can be achieved by an intelligent arrangement of the inwardly and outwardly directed notches or notch portions. In a further preferred embodiment of the invention, at least one side part of a laminate sheet is shaped to form a portion of a notch. Preferably, a laminate sheet comprises a first side part and a complementary second side part such that an arrangement of alternating laminate sheets and reversed laminate sheets comprises an annular laminate layer for the armature. In other words, the first side part and the second side part comprise complementary shapes, so that a sequence of laminate sheets, with every other laminate sheet "flipped" to present the mirror image of the neighboring laminate sheet, yields an annular laminate layer with an arrangement of notches. When a series of such annular laminate layers is stacked, the result is an arrangement of radial channels, as will become clear from the description of the drawings. A particularly favorable characteristic of the invention is that an entire armature can be constructed using only one laminate sheet shape, while at the same time providing a labyrinthine arrangement of radial cooling channels from the winding slots to the other side of the armature, and also at the same providing an uninterrupted path for the magnetic flux in the generator. A particularly cost-effective armature construction is therefore possible, since it is only necessary to cut or punch out a plurality of laminate sheets, all of which have the same shape. Therefore, only one type of tool, for example a punch or die, is needed to make the laminate sheets while at the same time providing for radial cooling channels in the armature.

To cool the windings during operation of the generator, a cooling airflow can be drawn into or forced into the axial cooling channels between the windings. This airflow can then pass from each axial cooling channel through the radial cooling channel and then, for example, into the interior of the stator. Preferably, the cooling arrangement according to embodiments of the invention comprises at least one fan for guiding the cooling airflow into the axial cooling channels. The fan can act to push air into the axial cooling channels so that a resulting overpressure forces the cooling airflow also into the radial cooling channels. Alternatively or in addition, a fan can be used to suck or draw air through the radial cooling channels into the stator interior, so that a supply of cooling air is in turn drawn into the axial cooling channels.

A cooling airflow can enter the armature at one end, for example at the drive end, and then pass along the axial cooling channels, whereby the cooling airflow will also pass into the series of inward-facing openings of the radial cooling channels. The effectiveness of the cooling airflow in an axial cooling channel may therefore be reduced by the time the remainder reaches the other end of that axial cooling channel. As a result, particularly when the generator is operating at or above its rated power, the stator windings may be optimally cooled at the airflow entry end (for example at the drive end) but less than optimally cooled at the opposite airflow exit end. Therefore, in a preferred embodiment of the invention, the cooling arrangement is realized to convey the cooling airflow into the axial cooling channel at both ends, i.e. from openings at the drive end of the armature and at the non-drive end of the armature. The cooling airflow can be forced into or drawn into the axial cooling channels and then forced or drawn into the radial cooling channels and into the armature interior cavity. In this way, a very effective cooling of the windings over their entire length can be achieved, as can an effective cooling of the armature body. The likelihood that the magnets become overheated during operation of the generator at rated or above-rated power output can therefore be reduced or even eliminated.

A cooling of the stator body is also important since this increases the efficiency of heat transfer from the windings. Therefore, in a further preferred embodiment of the invention, the cooling arrangement comprises an inner shroud arranged in the interior cavity of the stator and realized to confine the cooling airflow along an inner surface of the stator, at least before the cooling airflow continues on its path. In a further preferred embodiment of the invention, the cooling arrangement comprises a plurality of axial fin channels through which the cooling air-flow is conveyed, wherein an axial fin channel extends along a gap between adjacent cooling fins arranged on an inner surface of the stator in a direction essentially parallel to the axis of rotation of the generator. Such an arrangement of fins can be realized as an alternative or as an addition to an inner shroud in the interior cavity of the stator.

The cooling airflow through the stator can be confined to the stator itself, for example in a realization in which an inner stator is completely enclosed by an insulating layer.

Such an insulating layer may also act to ensure the integrity of the airgap between outer rotor and inner stator. However, it may be advantageous to allow a cooling airflow to also pass through the airgap. Therefore, in an alternative embodiment of the invention, the cooling arrangement comprises a number of openings in a cover element arranged between the generator airgap and the windings in an axial winding slot, wherein an opening is realized to allow passage of air from the airgap into the axial cooling channel between the windings. In this way, the airgap can also become part of the cooling airflow path. A "cover element" can be some kind of material wrapped about the stator, for example; or an arrangement of wedges placed on top of the windings in the winding slots to wedge the windings securely between adjacent stator teeth; or any other appropriate cover element.

The air for cooling the windings can be drawn in from outside the nacelle of the wind turbine. The heated air can be expelled from the nacelle to the outside, or may be cooled using a heat exchanger and "recycled" within the nacelle. To convey the cooling air from the nacelle to the drive end of the stator, in a preferred embodiment of the invention the stator comprises a number of axial stator ducts arranged in the stator interior for conveying the cooling airflow to the drive end of the stator. Such axial ducts can extend from a non-drive end face of the generator through to a drive-end face. At the drive-end of the stator, the cooling air may pass into a relatively large region between generator and hub, and may undergo a drop in pressure and may mix with warmer air already in that space. Therefore, in a preferred embodiment of the invention, the cooling arrangement comprises a drive-end cover for covering a drive-end of the stator to direct the cooling airflow from the stator interior into an axial winding path. The drive-end cover effectively acts to guide the cooling air from a stator duct more or less directly into the axial cooling channels.

BRIEF DESCRIPTION

Some of the embodiments will be described in detail, with reference to the following figures, wherein like designations denote like members, wherein:

FIG. 1 shows a schematic representation of a first embodiment of a laminate sheet;

FIG. 2 shows a section through a portion of an embodiment of a generator;

FIG. 3 shows a portion of the generator of FIG. 2;

DETAILED DESCRIPTION

Figure 4:
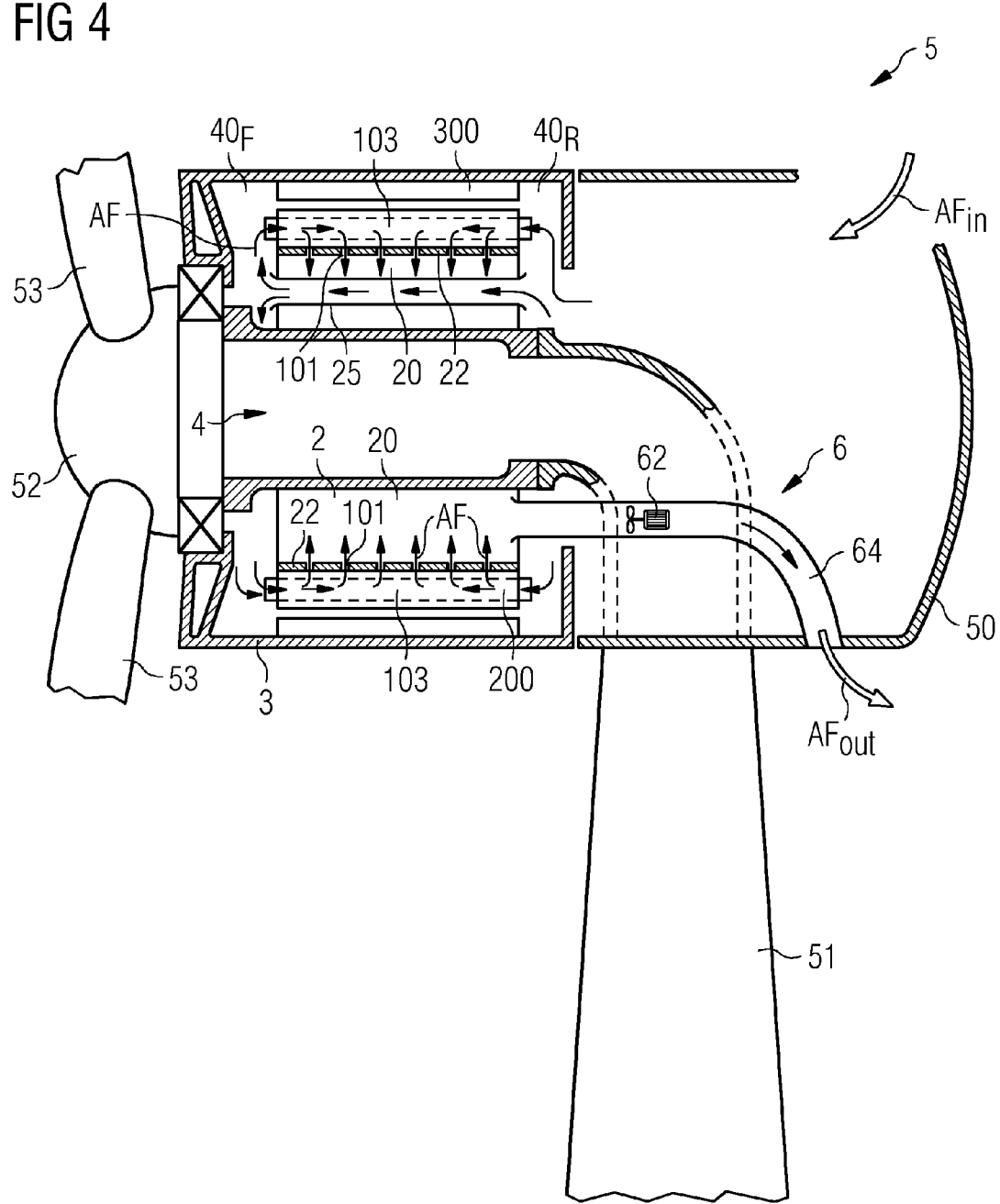
FIG. 4 is a schematic representation of a wind turbine with an embodiment of the cooling arrangement.

In the diagrams, like numbers refer to like objects throughout. Objects in the diagrams are not necessarily drawn to scale.

FIG. 1 shows a schematic representation of a first embodiment of a laminate sheet 1 according to embodiments of the invention. The diagram indicates the positions of a number of identical laminate sheets 1 with a first shape 1A in an annular laminate layer 14 (shown only partially). In this embodiment, each laminate sheet 1 comprises a single armature tooth protrusion 11. The diagram shows that the laminate sheet 1 can be "flipped" to give its mirror image, so that a series of such laminate sheets 1 can be assembled to give the annular laminate layer 14. For an armature with n poles, n such laminate sheets 1 are required in each annular laminate layer 14 or laminate sheet ring 14. The number of annular layers 14 required to assemble a stack will depend on the depth of the armature. When stacked, the armature tooth protrusions 11 result in an arrangement of armature teeth separated by axial winding slots 102 into which the stator windings can be placed.

The diagram shows that each laminate sheet 1 has two different but complementary side edges $E_{hi}$, $E_{lo}$. Each side edge $E_{hi}$, $E_{lo}$ forms a notch portion 10A, 10B. When one laminate sheet 1 adjoins a "flipped" or reversed identical laminate sheet 1, the complementary side edges $E_{hi}$-$E_{hi}$, $E_{lo}$-$E_{lo}$ form a complete notch 10.

By offsetting an annular laminate layer 14 (solid lines in the diagram) from an identical annular laminate layer (broken lines), a labyrinthine arrangement of radial cooling channels is achieved. This is illustrated in FIG. 2, which shows a section A-A through a portion of a generator, showing the armature 100 constructed of laminate sheets as described in FIG. 1. The armature 100 is part of a stator carrying an arrangement of windings 200 arranged in the axial winding slots. An outer rotor 3 carries magnets 300, and the rotor 3 is separated from the stator by a narrow airgap 42. The laminate layers of the armature 100 are assembled on an annular supporting structure 22. In this diagram, the axis of rotation would extend in the direction essentially parallel to the lower edge of the support structure. The diagram shows that the armature 100 is assembled by alternating a stack of eight identical annular laminate layers with an offset stack, so that "upper" notch series $S_{hi}$, alternate with "lower" notch series $S_{lo}$. A cooling airflow AF can pass along the axial cooling channel 103 and then on into the stator interior, as indicated by the airflow arrows. To this end, suitable openings are formed in the supporting structure 22, but these are not shown here for the sake of clarity.

FIG. 3 shows a portion of the generator 4 and indicates the plane of the cross-section A-A of FIG. 2. In this diagram, the axis of rotation would extend in a direction perpendicular to the plane of the drawing. Here, two windings 200 are arranged in each axial winding slot 102 such that they are separated by a gap, resulting in an axial cooling channel 103 along the length of the stator 2 or armature 100. In this exemplary embodiment, a cover wedge 26 is arranged on the upper or outer surfaces of the windings 200 to wedge these securely in the axial winding slot 102. A series of openings 260 in this cover wedge 26 allows air to also pass from the airgap 42 into the axial cooling channel 103 where it can join with the cooling airflow AF travelling axially along the axial cooling channel 103, and the total airflow passes on into the radial cooling channel 101 and into the stator interior (through openings 220 in the stator supporting structure 22). In this way, heat can also be effectively transferred from a magnet 300 to the cooling airflow AF.

FIG. 4 is a schematic representation of a wind turbine 5 with an embodiment of the cooling arrangement 6 according to embodiments of the invention. In this simplified diagram, only the relevant elements are shown, and a wind turbine tower 51, rotor hub 52 and rotor blades 53 are only indicated. The diagram shows an air intake $AF_{in}$, which is passed into the generator 4 where it can enter the axial cooling channels 103 from either end. This is made possible by guiding part of the cooling airflow AF through a number of stator ducts 25 from a non-drive end $40_R$ of the generator to the drive end $40_F$. The stator 2 is realized so that there is no other possible way for the cooling airflow AF to reach the drive end $40_F$ of the stator 2. This embodiment therefore allows an efficient cooling of the windings 200, since relatively cool air enters each axial cooling channel 103 at both ends. The warmed air exits each axial cooling channel 103 through a plurality of radial cooling channels 101 and through corresponding perforations in the stator supporting structure 22, and can pass into the stator interior 20. From here, the warmed exhaust air is drawn out of the stator interior cavity 20 by an extractor fan 62 in an exhaust duct 64, which acts to expel the exhaust air $AF_{out}$ to the exterior of the nacelle 50.

Although not shown in the diagram, the air intake $AF_{in}$, can be filtered and dried by a filtration unit and a mist eliminator module. Furthermore, the cooling airflow can be actively "pushed" into the stator by a fan, which can enhance or replace the functionality of the exhaust fan 62 shown in this diagram.

Figure 5:
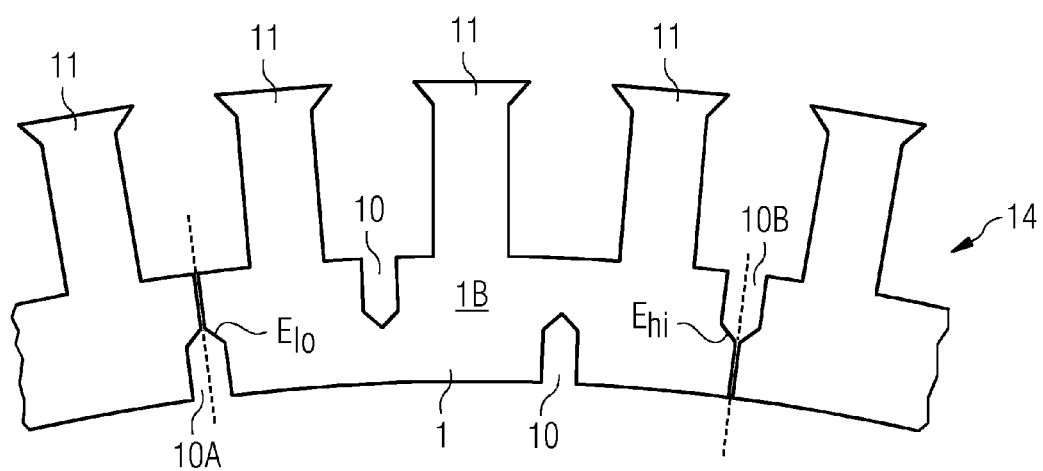
FIG. 5 shows a schematic representation of a second embodiment of a laminate sheet.

FIG. 5 shows a schematic representation of a second embodiment of a laminate sheet 1 according to embodiments of the invention. Here also, the diagram indicates the position of the laminate sheet 1 in an annular laminate layer 14. In this embodiment, each laminate sheet 1 comprises an odd number of stator tooth protrusions 11, two complementary side edges $E_{hi}$, $E_{lo}$ to give notch portions 10A, 10B, and an even number of complete notches 10. In this case also, the laminate sheet 1 can be "flipped" to give its mirror image, and a series of such laminate sheets 1 can be assembled to give an annular laminate layer. By offsetting a stack of such layers from another layer stack by one stator tooth, so that a series of "upper" notches adjoins a series of "lower" notches, a labyrinthine arrangement of radial cooling channels is achieved as explained in FIG. 1 above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A generator armature of a generator, the generator armature comprising:
    a plurality of identical laminate sheets arranged in a laminate stack to form an annular arrangement of armature teeth, wherein each-armature tooth is separated from the next armature tooth by an axial winding slot extending a direction essentially parallel to an axis of rotation of a generator; and
    a plurality of radial cooling channels, wherein a radial cooling channel of the plurality of radial cooling channels is configured to transport a cooling medium and extends from the axial winding slot to an interior cavity of the generator, and wherein the radial cooling channel comprises a series of aligned notches in the plurality of identical laminate sheets of the laminate stack.

2. The generator armature according to claim 1, wherein the radial cooling channel comprises at least a first series of aligned notches and a second series of aligned notches, wherein the second series of aligned notches is offset from the first series of aligned notches.

3. The generator armature according to claim 1, wherein each identical laminate sheet comprises a number of armature tooth protrusions between a first side part of the laminate sheet and a second side part of the identical laminate sheet, wherein at least one of the first side part of the identical laminate sheet and the second side part of the identical laminate sheet is shaped to form a portion of a notch.

4. The generator armature according to claim 3, wherein the first side part and the second side part comprise complementary shapes.

5. A plurality of identical laminate sheets for an armature of a generator, each identical laminate sheet of the plurality of identical laminate sheets comprising:
    a plurality of armature tooth protrusions located on an edge of the identical laminate sheets;
    a first side part and a second side part, each side part having a partial notch feature, wherein the first side part has a partial notch feature located on the same edge as the armature tooth protrusion, and the second side part has a partial notch feature located on an edge opposite the edge having the armature tooth protrusion; and
    a complete notch arranged to one side of an armature tooth protrusion of the plurality of armature tooth protrusions.

6. The plurality of identical laminate sheets according to claim 5, wherein a layered series of identical laminate sheets is used to form an annular laminate layer for the armature of the generator, further wherein each identical laminate sheet of the plurality of identical laminate sheets is one of offset and reversed with respect to an adjacent identical laminate sheet in the layered series of identical laminate sheets.

7. A cooling arrangement configured to cool stator windings of a stator of a generator, the cooling arrangement comprising:
    a stator comprising an armature, wherein the armature comprises a plurality of identical laminate sheets arranged in a laminate stack to form an annular arrangement of armature teeth, wherein each armature tooth is separated from the next armature tooth by an axial winding slot extending a direction essentially parallel to an axis of rotation of a generator;
    a plurality of stator windings, wherein two adjacent stator windings are located in each axial winding slot;
    a plurality of axial cooling channels, wherein an axial cooling channel of the plurality of axial cooling channels extends along a gap between the two adjacent stator windings arranged in the axial winding slot of the armature;
    a plurality of radial cooling channels, wherein each radial cooling channel of the plurality of radial cooling channels is configured to transport a cooling medium and extends from the axial winding slot to an interior cavity of the generator, and wherein each radial cooling channel of the plurality of radial cooling channels comprises a series of aligned notches in the plurality of identical laminate sheets of the laminate stack;
    a fan configured to guide the cooling medium into the plurality of axial cooling channels and subsequently through the plurality of radial cooling channels into the interior cavity of the generator.

8. The cooling arrangement according to claim 7, wherein the fan is configured to convey the cooling medium into the axial cooling channels at both ends of the axial cooling channels.

9. The cooling arrangement according to claim 7, further comprising:
    a generator airgap located adjacent to the stator; and
    a cover element arranged between the generator airgap and the stator windings in the axial winding slot, wherein the cover element includes an opening configured to allow passage of air from the generator airgap into the axial cooling channel between the stator windings.

10. The cooling arrangement according to claim 7, further comprising:
an outer rotor;
wherein the stator is arranged on an annular stator supporting structure.

11. The cooling arrangement according to claim 7, wherein the stator comprises a number of axial stator ducts arranged in the stator interior for conveying the cooling medium to a drive end of the stator.

12. The cooling arrangement according to claim 7, wherein the cooling arrangement is included in a wind turbine.

13. The cooling arrangement according to claim 12, further comprising an exhaust duct for conveying an exhaust airflow out of the stator to the exterior of the wind turbine, and a fan arranged in the exhaust duct.

14. A method of cooling stator windings arranged on an armature of a generator, the method comprising:
providing an armature according to claim 1;
providing a pair of stator windings in each axial winding slot of the armature; and
providing a plurality of axial cooling channels in fluid connection with the radial cooling channels, wherein each axial cooling channel extends along a gap between adjacent stator windings arranged in an axial winding slot of the armature;
wherein the cooling medium can freely move through the plurality of axial cooling channels and subsequently through the radial cooling channels of the armature into an interior cavity of the generator.

* * * * *